United States Patent
Fischer

(10) Patent No.: US 9,591,450 B2
(45) Date of Patent: Mar. 7, 2017

(54) PROVIDING OTDOA PRS ASSISTANCE DATA

(71) Applicant: QUALCOMM Incorporated, San Diego, CA (US)

(72) Inventor: Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/217,767

(22) Filed: Jul. 22, 2016

(65) Prior Publication Data
US 2016/0337798 A1 Nov. 17, 2016

Related U.S. Application Data

(62) Division of application No. 14/089,738, filed on Nov. 25, 2013, now Pat. No. 9,432,809.
(Continued)

(51) Int. Cl.
*H04W 24/00* (2009.01)
*H04W 4/02* (2009.01)
(Continued)

(52) U.S. Cl.
CPC .......... *H04W 4/023* (2013.01); *G01S 5/0236* (2013.01); *G01S 5/10* (2013.01); *H04L 5/0048* (2013.01);
(Continued)

(58) Field of Classification Search
None
See application file for complete search history.

(56) References Cited

U.S. PATENT DOCUMENTS

2010/0317343 A1 12/2010 Krishnamurthy et al.
2011/0039577 A1* 2/2011 Stern-Berkowitz ... G01S 5/0205
455/456.1
(Continued)

FOREIGN PATENT DOCUMENTS

WO WO-2010151217 A2 12/2010
WO WO-2011020008 A2 2/2011

OTHER PUBLICATIONS

International Search Report and Written Opinion—PCT/US2014/043940—ISA/EPO—Jan. 27, 2015.

*Primary Examiner* — Suhail Khan
(74) *Attorney, Agent, or Firm* — Silicon Valley Patent Group LLP

(57) ABSTRACT

Disclosed embodiments pertain to the obtaining and utilization of Observed Time Difference of Arrival (OTDOA) assistance data. Cell timing information obtained based on measurements by a Mobile Station (MS) of neighbor cells may comprise cell timing offsets of the neighbor cells relative to a serving cell for the MS. OTDOA assistance data may be generated, where the OTDOA assistance data may comprise an OTDOA assistance data reference cell and a cell timing offset between the serving cell and an OTDOA assistance data reference cell, the reference cell being selected based on the received neighbor cell measurements. Embodiments disclosed also pertain to methods on an MS for performing measurements of neighbor cells comprising cell timing information for neighbor cells by requesting idle periods with a desired length from a base station to perform the measurements, and performing the requested measurements upon receiving confirmation that the idle periods have been configured.

21 Claims, 9 Drawing Sheets

Related U.S. Application Data

(60) Provisional application No. 61/845,872, filed on Jul. 12, 2013.

(51) Int. Cl.
| | | |
|---|---|---|
| *G01S 5/02* | (2010.01) | |
| *G01S 5/10* | (2006.01) | |
| *H04W 64/00* | (2009.01) | |
| *H04L 5/00* | (2006.01) | |
| H04W 88/02 | (2009.01) | |
| H04W 88/08 | (2009.01) | |

(52) U.S. Cl.
CPC ............ *H04W 64/00* (2013.01); *H04W 88/02* (2013.01); *H04W 88/08* (2013.01)

(56) References Cited

U.S. PATENT DOCUMENTS

| | | |
|---|---|---|
| 2012/0015667 A1 | 1/2012 | Woo et al. |
| 2012/0108270 A1 | 5/2012 | Kazmi et al. |
| 2012/0149392 A1 | 6/2012 | Siomina et al. |
| 2012/0252487 A1 | 10/2012 | Siomina et al. |
| 2013/0059610 A1* | 3/2013 | Siomina ............... H04W 24/10 455/456.6 |
| 2013/0122930 A1 | 5/2013 | Woo et al. |
| 2013/0190006 A1 | 7/2013 | Kazmi et al. |
| 2015/0018010 A1 | 1/2015 | Fischer |

\* cited by examiner

200

210

Request, from an MS, measurements including cell timing information, for one or more neighbor cells of the MS and, optionally, CGI of measured neighbor cells.

220

Receive neighbor cells measurements for a subset of the one or more neighbor cells, the neighbor cell measurements including cell timing information comprising cell timing offsets of the neighbor cells in the subset relative to a serving cell for the MS, where each cell timing offset is associated with a distinct neighbor cell in the subset

230

Generate OTDOA assistance data comprising an OTDOA assistance data reference cell and a cell timing offset between the serving cell and the OTDOA assistance data reference cell, the OTDOA assistance data reference cell being selected based on the received neighbor cell measurements.

240

Send OTDOA assistance data and a request for OTDOA measurements to the MS.

310
Request idle periods from a base station for obtaining cell timing information and/or CGI, the request for idle periods being made in response to a request for measurements pertaining to one or more neighbor cells The request for idle periods may include an indication whether DRX are desired, or a request to use autonomous gaps.

↓

320
Receive confirmation that idle periods have been configured; e.g., appropriate DRX configuration, or that autonomous gaps are allowed at the UE.

↓

330
Perform the requested measurements and obtain cell timing information during idle periods, and the CGI, if requested

↓

340
Send the measurements and the cell timing offset to the location server (e.g., offset between the SFN of the serving cell and the SFN of the measured neighbour cell), and the CGI of the measured cell, if requested.

Receive OTDOA assistance data, which includes the SFN-offset between the MS serving cell and the OTDOA assistance data reference cell.

420
Determine the SFN of the OTDOA assistance data reference cell based on the SFN of the serving cell and the SFN-offset included in the assistance data

430
Determine the PRS occasions of the neighbor cells based on the SFN of the assistance data reference cell and the PRS information included in the OTDOA assistance data

Fig. 6

PROVIDING OTDOA PRS ASSISTANCE DATA

CROSS REFERENCE TO RELATED APPLICATIONS

This application is a divisional application of U.S. patent application Ser. No. 14/089,738 entitled "PROVIDING OTDOA PRS ASSISTANCE DATA" filed Nov. 25, 2013, which, in turn, claims the benefit of and priority to U.S. Provisional Application No. 61/845,872 entitled "PROVIDING OTDOA PRS ASSISTANCE DATA" filed Jul. 12, 2013, which is assigned to the assignee hereof. All of the above applications are incorporated by reference, in their entireties, herein.

FIELD

The subject matter disclosed herein relates to providing Positioning Reference Signal (PRS) assistance data.

BACKGROUND

It is often desirable to know the location of a terminal such as a cellular phone. For example, a location services (LCS) client may desire to know the location of a terminal in the case of an emergency services call or to provide some service to the user of the terminal such as navigation assistance or direction finding. The terms "location" and "position" are synonymous and are used interchangeably herein.

In Observed Time Difference of Arrival (OTDOA) based positioning, the mobile station may measure time differences in received signals from a plurality of base stations. Because positions of the base stations are known, the observed time differences may be used to calculate the location of the terminal To further help location determination, Positioning Reference Signals (PRS) are often provided by a base station (BS) in order to improve OTDOA positioning performance. The measured time difference of arrival of the PRS from a reference cell (e.g. the serving cell) and one or more neighboring cells is known as the Reference Signal Time Difference (RSTD). Using the RSTD measurements, the absolute or relative transmission timing of each cell, and the known position(s) of BS physical transmitting antennas for the reference and neighboring cells, the Mobile Stations' (MS') position may be calculated.

To facilitate OTDOA based positioning, a location server may include assistance data for at least one cell, for which cell timing (System Frame Number (SFN)) may be obtained by the Mobile Station (MS). The assistance data may pertain to an assistance data reference cell or one or more cells selected from a neighboring cell list. Typically, OTDOA assistance data pertaining to the serving cell is provided because cell timing (such as the System Frame Number) information for the serving cell is generally available to the MS.

However, in some situations, the serving cell cannot be included in the OTDOA assistance data. For example, the serving cell for the MS may be a Femto cell, whose location and timing may not be known to the location server. In other instances, PRS may not be configured for Femto cells. As a further example, the MS serving cell may belong to a frequency layer operating at frequency f1, while PRS' or assistance data cells are deployed on inter-frequency layer operating at frequency f2.

Therefore, there is a need for apparatus, systems and methods to improve position determinations and permit the use of PRS signals for location determination in situations where the serving cell cannot be included in the OTDOA assistance data.

SUMMARY

In some embodiments, a method of providing OTDOA assistance information, is disclosed where the method comprises: requesting, from an MS, measurements including cell timing information for one or more neighbor cells of the MS; receiving neighbor cell measurements for a subset of the one or more neighbor cells, the neighbor cell measurements including cell timing information comprising cell timing offsets of the neighbor cells in the subset relative to a serving cell for the MS, each cell timing offset associated with a distinct neighbor cell in the subset; and generating OTDOA assistance data comprising an OTDOA assistance data reference cell and a cell timing offset between the serving cell and the OTDOA assistance data reference cell, the OTDOA assistance data reference cell being selected based on the received neighbor cell measurements.

Disclosed embodiments also pertain to a method on an MS comprising: requesting idle periods with a desired length from a base station, the request for idle periods being made in response to a request, received by the MS, for measurements pertaining to the one or more neighbor cells, the requested measurements comprising at least one of a System Frame Number (SFN) or a Cell Global Identity (CGI) for the one or more neighbor cells; and performing the requested measurements for a subset of the one or more neighbor cells during the idle periods, upon receiving confirmation that the idle periods have been configured, wherein the measurements further comprise cell timing information for neighbor cells in the subset.

In another aspect, a method on an MS may comprise: receiving OTDOA assistance data comprising a System Frame Number (SFN) offset between a serving cell of the MS and an OTDOA assistance data reference cell, the OTDOA assistance data reference cell selected from a set of neighbor cells of the MS, and wherein the OTDOA assistance data is based, at least in part, on measurements performed by the MS of cells in the set of neighbor cells; determining an SFN of the OTDOA assistance data reference cell based on an SFN of the serving cell and the SFN-offset included in the OTDOA assistance data; and determining Positioning Reference Signal (PRS) occasions of the set of neighbor cells based on the SFN of the OTDOA assistance data reference cell and PRS information included in the OTDOA assistance data.

In some embodiments, a server may comprise: a processor, wherein the processor is configured to request, from an MS, measurements including cell timing information for one or more neighbor cells of the MS, the cell timing information comprising cell timing offsets of the neighbor cells relative to a serving cell for the MS, each cell timing offset associated with a distinct neighbor cell, and a communications interface coupled to the processor, the communications interface configured to receive the neighbor cell measurements for a subset of the neighbor cells. The processor may be further configured to generate OTDOA assistance data comprising an OTDOA assistance data reference cell and a cell timing offset between the serving cell and the OTDOA assistance data reference cell, wherein the OTDOA assistance data reference cell is selected based on the received neighbor cell measurements.

In some embodiments, an MS may comprise: a transceiver, the transceiver to receive a request for measurements pertaining to one or more neighbor cells, the requested measurements comprising at least one of a System Frame Number (SFN) or a Cell Global Identity (CGI) for the one or more neighbor cells; and a processor coupled to the transceiver. Further, the processor is configured to: request idle periods with a desired length from a base station, the request for idle periods being made in response to the request for measurements pertaining to the one or more neighbor cells, and perform the requested measurements for a subset of the one or more neighbor cells during the idle periods, upon receiving confirmation that the idle periods have been configured, wherein the measurements comprise cell timing information for neighbor cells in the subset.

In some embodiments, an MS may comprise: a transceiver to receive OTDOA assistance data comprising the System Frame Number (SFN) offset between a serving cell of the MS and an OTDOA assistance data reference cell, the OTDOA assistance data reference cell selected from a set of neighbor cells of the MS, and wherein the OTDOA assistance data is based, at least in part, on measurements performed by the MS of cells in the set of neighbor cells; and a processor coupled to the transceiver. Further, the processor may be configured to: determine an SFN of the OTDOA assistance data reference cell based on an SFN of the serving cell and the SFN-offset included in the OTDOA assistance data; and determine Positioning Reference Signal (PRS) occasions of the set of neighbor cells based on the SFN of the OTDOA assistance data reference cell and PRS information included in the OTDOA assistance data.

In some embodiments, an apparatus may comprise: means for requesting, from a MS, measurements including cell timing information for one or more neighbor cells of the MS, the cell timing information comprising cell timing offsets of the neighbor cells relative to a serving cell for the MS, each cell timing offset associated with a distinct neighbor cell; means for receiving the requested neighbor cell measurements for a subset of the neighbor cells; and means for generating OTDOA assistance data comprising an OTDOA assistance data reference cell and a cell timing offset between the serving cell and the OTDOA assistance data reference cell, the OTDOA assistance data reference cell being selected based on the received neighbor cell measurements.

In some embodiments, an MS may comprise: means for receiving a request for measurements pertaining to one or more neighbor cells, the requested measurements comprising at least one of a System Frame Number (SFN) or a Cell Global Identity (CGI) for the one or more neighbor cells; means for requesting idle periods with a desired length from a base station, the request for idle periods being made in response to the request for measurements pertaining to the one or more neighbor cells, and means for performing the requested measurements for a subset of the one or more neighbor cells during the idle periods, upon receiving confirmation that the idle periods have been configured, wherein the measurements comprise cell timing information for neighbor cells in the subset.

Further, in some embodiments, an MS may comprise: means for receiving OTDOA assistance data comprising a System Frame Number (SFN) offset between a serving cell of the MS and an OTDOA assistance data reference cell, the OTDOA assistance data reference cell selected from a set of neighbor cells of the MS, and wherein the OTDOA assistance data is based, at least in part, on measurements performed by the MS of cells in the set of neighbor cells; means for determining an SFN of the OTDOA assistance data reference cell based on a SFN of the serving cell and the SFN-offset included in the OTDOA assistance data; and means for determining Positioning Reference Signal (PRS) occasions of the set of neighbor cells based on the SFN of the OTDOA assistance data reference cell and PRS information included in the OTDOA assistance data.

In some embodiments, a non-transitory computer-readable medium may comprise instructions, which, when executed by a processor performs steps in a method for providing OTDOA assistance information, where the steps may comprise: requesting, from an MS, measurements including cell timing information for one or more neighbor cells of the MS; receiving neighbor cell measurements for a subset of the one or more neighbor cells, the neighbor cell measurements including cell timing information comprising cell timing offsets of the neighbor cells in the subset relative to a serving cell for the MS, each cell timing offset associated with a distinct neighbor cell in the subset; and generating OTDOA assistance data comprising an OTDOA assistance data reference cell and a cell timing offset between the serving cell and the OTDOA assistance data reference cell, the OTDOA assistance data reference cell being selected based on the received neighbor cell measurements.

In some embodiments, a non-transitory computer-readable medium may comprise instructions, which, when executed by a processor, perform steps in a method on a Mobile Station (MS), where the steps may comprise: requesting idle periods with a desired length from a base station, the request for idle periods being made in response to a request, received by the MS, for measurements pertaining to the one or more neighbor cells, the requested measurements comprising at least one of a System Frame Number (SFN) or a Cell Global Identity (CGI) for the one or more neighbor cells; and performing the requested measurements for a subset of the one or more neighbor cells during the idle periods, upon receiving confirmation that the idle periods have been configured, wherein the measurements comprise cell timing information for neighbor cells in the subset.

In some embodiments, a non-transitory computer-readable medium may comprise instructions, which, when executed by a processor, perform steps in a method on a Mobile Station (MS), the steps may comprise: receiving OTDOA assistance data comprising a System Frame Number (SFN) offset between a serving cell of the MS and an OTDOA assistance data reference cell, the OTDOA assistance data reference cell selected from a set of neighbor cells of the MS, and wherein the OTDOA assistance data is based, at least in part, on measurements performed by the MS of cells in the set of neighbor cells; determining an SFN of the OTDOA assistance data reference cell based on an SFN of the serving cell and the SFN-offset included in the OTDOA assistance data; and determining Positioning Reference Signal (PRS) occasions of the set of neighbor cells based on the SFN of the OTDOA assistance data reference cell and PRS information included in the OTDOA assistance data.

The methods disclosed may be performed by one or more of servers including location servers, mobile stations, etc. using LPP, LPPe or other protocols. Embodiments disclosed also relate to software, firmware, and program instructions created, stored, accessed, read or modified by processors using non-transitory computer readable media or computer readable memory.

BRIEF DESCRIPTION OF THE DRAWINGS

FIG. 4 shows a flowchart for an exemplary method for providing OTDOA assistance data to an MS in a manner consistent with disclosed embodiments.

FIG. 5 shows a flowchart for an exemplary method for obtaining cell timing information (such as the SFN) for neighbor cells and performing OTDOA measurements in a manner consistent with disclosed embodiments.

FIG. 6 shows a flowchart for an exemplary method for determining the PRS occasions of assistance data cells, where the assistance data cells do not include the serving cell of the MS.

DETAILED DESCRIPTION

The terms "mobile station" (MS), "user equipment" (UE) or "target" are used interchangeably herein and may refer to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The terms are also intended to include devices which communicate with a personal navigation device (PND), such as by short-range wireless, infrared, wireline connection, or other connection—regardless of whether satellite signal reception, assistance data reception, and/or position-related processing occurs at the device or at the PND.

In addition, the terms MS, UE, "mobile station" or "target" are intended to include all devices, including wireless and wireline communication devices, computers, laptops, etc. which are capable of communication with a server, such as via the Internet, WiFi, cellular wireless network, DSL network, packet cable network or other network, and regardless of whether satellite signal reception, assistance data reception, and/or position-related processing occurs at the device, at a server, or at another device associated with the network. Any operable combination of the above are also considered a "mobile station."

Figure 1:
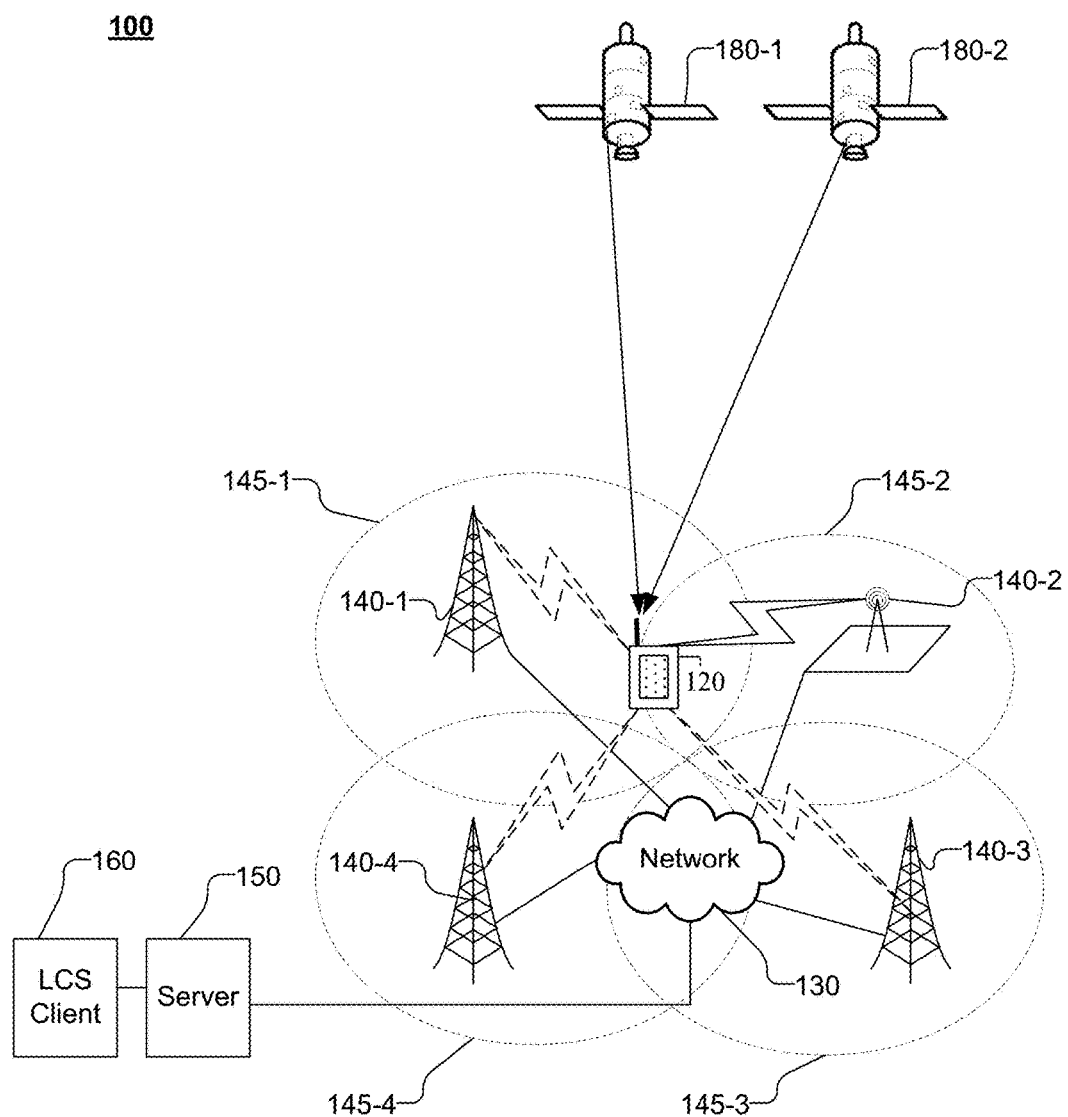
FIG. 1 shows an architecture of an exemplary system 100 capable of providing Location Services to MS 120 including the transfer of location assistance data or location information.

FIG. 1 shows an architecture of a system 100 capable of providing Location Services to MS 120 including the transfer of location assistance data or location information, using messages such as Long Term Evolution (LTE) Positioning Protocol (LPP) or LPP extensions (LPPe) messages between MS 120 and server 150, which, in some instances, may take the form of a location server or another network entity. The transfer of the location information may occur at a rate appropriate to both MS 120 and server 150. LPP is well-known and described in various publicly available technical specifications from an organization known as the 3rd Generation Partnership Project (3GPP). LPPe has been defined by the Open Mobile Alliance (OMA) and may be used in combination with LPP such that each combined LPP/LPPe message would be an LPP message comprising an embedded LPPe message.

For simplicity, only one MS 120 and server 150 are shown in FIG. 1. In general, system 100 may comprise multiple cells indicated by 145-$k$ ($0 \leq k \leq N_{cells}$, where $N_{cells}$ is the number of cells) with additional networks 130, LCS clients 160, mobile stations 120, servers 150, (base station) antennas 140, and Space Vehicles (SVs) 180. System 100 may further comprise a mix of cells including macrocells such as cells 145-1, 145-3, and 145-4 along with femtocells such as cell 145-2 in a manner consistent with embodiments disclosed herein.

MS 120 may be capable of wirelessly communicating with server 150 through one or more networks 130 that support positioning and location services, which may include but is not limited to the Secure User Plane Location (SUPL) location solution defined by OMA and the Control Plane location solution defined by 3GPP for use with an LTE serving network. For example, Location services (LCS) may be performed on behalf of LCS Client 160 that accesses server 150 (which may take the form of a location server) and issues a request for the location of MS 120. Server 150 may then respond to LCS client 160 with a location estimate for MS 120. LCS Client 160 may also be known as a SUPL Agent—e.g. when the location solution used by server 150 and MS 120 is SUPL. In some embodiments, MS 120 may also include an LCS Client or a SUPL agent (not shown in FIG. 1) that may issue a location request to some positioning capable function within MS 120 and later receive back a location estimate for MS 120. The LCS Client or SUPL Agent within MS 120 may perform location services for the user of MS 120—e.g. provide navigation directions or identify points of interest within the vicinity of MS 120.

Server 150 as used herein may be a SUPL Location Platform (SLP), an evolved Serving Mobile Location Center (eSMLC), a Serving Mobile Location Center (SMLC), a Gateway Mobile Location Center (GMLC), a Position Determining Entity (PDE), a Standalone SMLC (SAS), and/or the like.

As illustrated in FIG. 1, the MS 120 may communicate with server 150 through network 130 and antennas 140, which may be associated with network 130. MS 120 may receive and measure signals from antennas 140, which may be used for position determination. For example, MS 120 may receive and measure signals from one or more of antennas 140-1, 140-2, 140-3 and/or 140-4, which may be associated with cells 145-1, 145-2, 145-3 and 145-4, respectively. In some embodiments, antennas 140 may form part of a wireless communication network, which may be a wireless wide area network (WWAN), wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), WiMax and so on.

A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM, W-CDMA, and LTE are described in documents from 3GPP. Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN. For example, antennas 140 and network 130 may form part of, e.g., an evolved UMTS Terrestrial Radio Access Network (E-UTRAN) (LTE) network, a W-CDMA UTRAN network, a GSM/EDGE Radio Access Network (GERAN), a 1×RTT network, an Evolution-Data Optimized (EvDO) network, a WiMax network or a WLAN.

MS 120 may also receive signals from one or more Earth orbiting Space Vehicles (SVs) 180-1 or 180-2 collectively referred to as SVs 180, which may be part of a satellite positioning system (SPS). SVs 180, for example, may be in a constellation of Global Navigation Satellite System (GNSS) such as the US Global Positioning System (GPS), the European Galileo system, the Russian Glonass system or the Chinese Compass or BeiDou system. In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Figure 2:
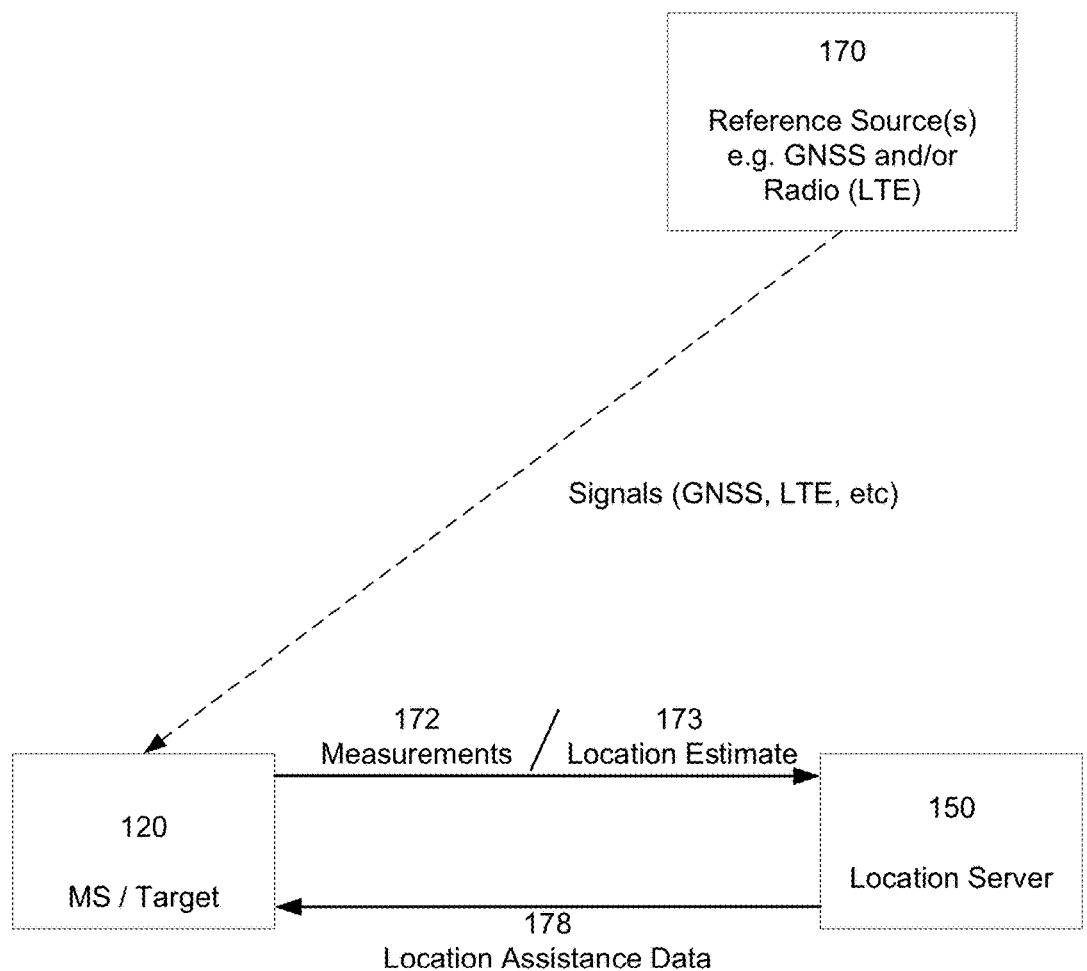
FIG. 2 shows a simplified block diagram illustrating some entities in a system 175 capable of determining the location of MS 120.

FIG. 2 shows a simplified block diagram illustrating some entities in a system 175 capable of determining the location of MS 120. Referring to FIG. 2, server 150 may provide location related information, such as an approximate location of MS 120 and/or location assistance data 178 to MS 120, which may be used to assist MS 120 in acquiring and measuring signals from SVs 180 and antennas 140, and/or in deriving or refining a location estimate 173 from measurements 172.

MS 120 may measure signals from reference source(s) 170 to obtain measurements 172 and/or location estimate 173. MS 120 may obtain measurements 172 by measuring pseudo-range measurements for SVs 180 and/or OTDOA related measurements from antennas 140. Reference source(s) 170 may represent signals from SVs 180 and/or antennas 140 associated with cells 145 in network 130. In some instances, the OTDOA related measurements taken by MS 120 may be sent to server 150 to derive a position estimate for MS 120. For example, MS 120 may provide location related information, such as location estimate 173 or measurements 172 (e.g., satellite measurements from one or more GNSS' or various network measurements such as RSTDs from one or more networks, etc.) to server 150.

In some instances, MS 120 may also obtain a location estimate 173 by using measurements 172, which may be pseudo-range and/or OTDOA related measurements to derive an estimated position for MS 120. For example, MS 120 may use the difference in the arrival times of downlink radio signals from a plurality of base stations (such as eNodeBs) to compute the user/MS position. For example, if a signal from cell 145-1 is received at time t1, and a signal from cell 145-3 is received at time t2, then the OTDOA or RSTD is given by t2−t1 Generally, t2 and t1 are known as Time Of Arrival (TOA) measurements.

In some embodiments, MS 120 may take the form of a Secure User Plane (SUPL) Enabled Terminal (SET) and may communicate with server 150 and use location assistance data 178 to obtain a location estimate for MS 120, which may then be communicated to LCS client 160 (not shown in FIG. 2).

Figure 3A:
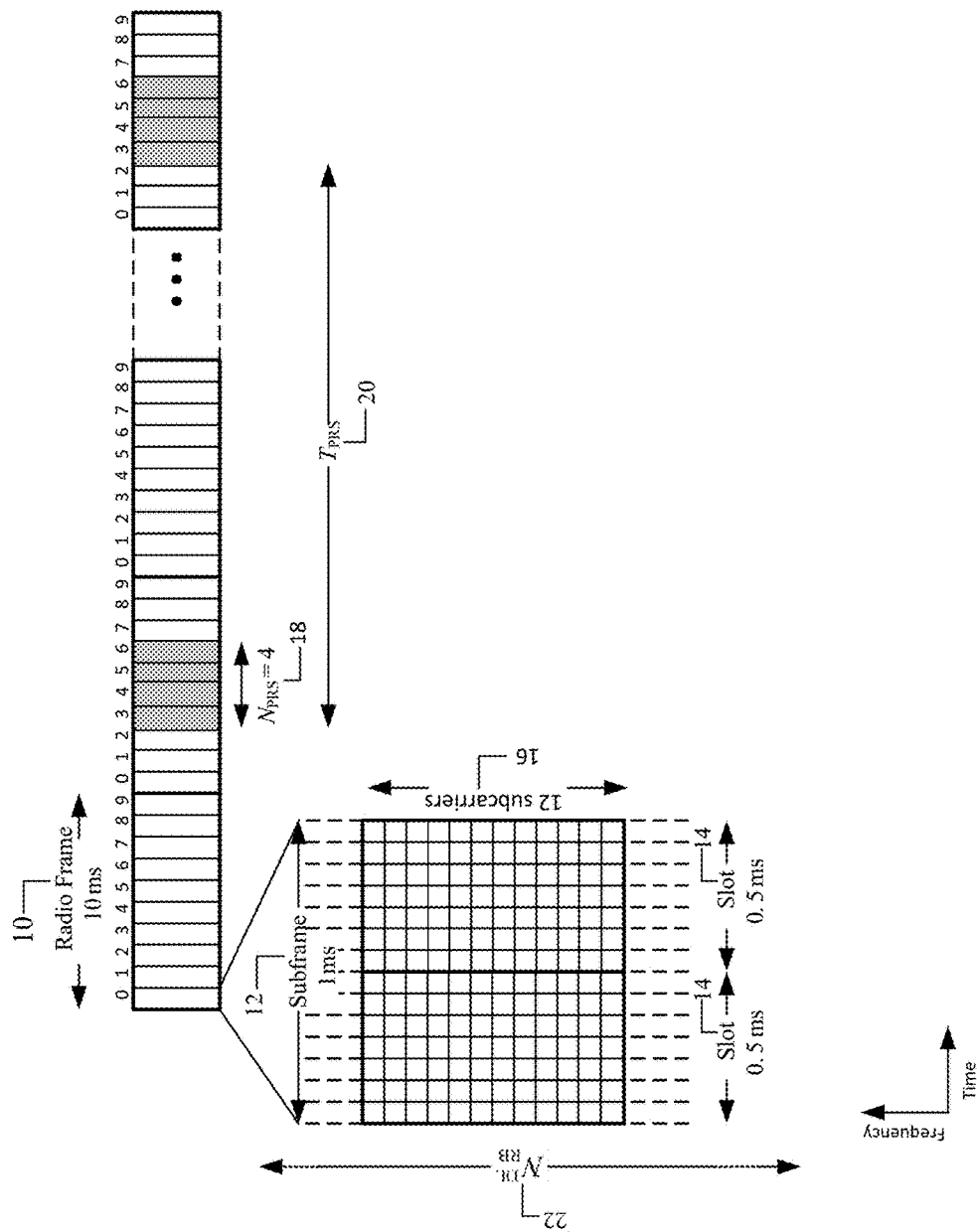
FIG. 3A shows the structure of an exemplary LTE frame with Positioning Reference Signals (PRS).

FIG. 3A shows the structure of an exemplary LTE frame with PRS occasions. In FIG. 3A, time is shown on the X (horizontal) axis, while frequency is shown on the Y (vertical) axis. As shown in FIG. 3A, downlink and uplink LTE Radio Frames 10 are of 10 ms duration each. For downlink Frequency Division Duplex (FDD) mode, Radio Frames 10 are organized into ten subframes 12 of 1 ms duration each. Each subframe 12 comprises two slots 14, each of 0.5 ms duration.

In the frequency domain, the available bandwidth may be divided into uniformly spaced orthogonal subcarriers 16. For example, for a normal length cyclic prefix using 15 KHz spacing, subcarriers 16 may be grouped into a group of 12. Each grouping, which comprises 12 subcarriers 16, in FIG. 3A, is termed a resource block and in the example above the number of subcarriers in the resource block may be written as $N_{SC}^{RB}=12$. For a given channel bandwidth, the number of available resource blocks on each channel 22, which is also called the transmission bandwidth configuration 22, is given by $N_{RB}^{DL}$ 22. For example, for a 3 MHz channel bandwidth in the above example, the number of available resource blocks on each channel 22 is given by $N_{RB}^{DL}=15$.

Referring to FIG. 1, in some embodiments, antennas 140-1-140-4 corresponding to cells 145-1-145-4, respectively, may also transmit Positioning Reference Signals (PRS). PRS, which have been defined in 3GPP Long Term Evolution (LTE) Release-9, are transmitted by a base station in special positioning subframes that are grouped into positioning occasions. For example, in LTE, the positioning occasion, $N_{PRS}$ can comprise 1, 2, 4, or 6 consecutive positioning subframes ($N_{PRS} \in \{1, 2, 4, 6\}$) and occurs periodically at 160, 320, 640, or 1280 millisecond intervals. In the example shown in FIG. 3A, the number of consecutive positioning subframes 18 is 4 and may be written as $N_{PRS}=4$. The positioning occasions recur with PRS Periodicity 20. In FIG. 3A, PRS Periodicity 20 is denoted by $T_{PRS}$. In some embodiments, $T_{PRS}$ may be measured in terms of the number of subframes between the start of consecutive positioning occasions.

Within each positioning occasion, PRSs are transmitted with a constant power. PRS can also be transmitted with zero power (i.e., muted). Muting, which turns off a regularly scheduled PRS transmission, may be useful when PRS patterns between cells overlap. Muting aids signal acquisition by MS 120. Muting may be viewed as the non-transmission of a PRS for a given positioning occasion in a particular cell. Muting patterns may be signaled to MS 120 using bitstrings. For example, in a bitstring signaling a muting pattern, if a bit at position j is set to "0", then an MS may infer that the PRS is muted for the $j^{th}$ positioning occasion.

To further improve hearability of PRS, positioning subframes may be low-interference subframes that are transmitted without user data channels. As a result, in ideally synchronized networks, PRSs may receive interference from other cell PRSs with the same PRS pattern index (i.e., with the same frequency shift), but not from data transmissions. The frequency shift, in LTE, for example, is defined as a function of the Physical Cell Identifier (PCI) resulting in an effective frequency re-use factor of 6.

The PRS configuration parameters such as the number of consecutive positioning subframes, periodicity, muting pattern, etc. may be configured by network 130 and may be signaled to MS 120 (e.g. by server 150) as part of the OTDOA assistance data. For example, LPP or LPPe messages between MS 120 and server 150 may be used to transfer location assistance data 178 including OTDOA assistance data. OTDOA assistance data may include reference cell information and neighbor cell lists. The reference cell and neighbor cell lists may each contain the PCIs of the cells as well as PRS configuration parameters for the cells.

OTDOA assistance data are usually provided for one or more "neighbor cells" or "neighboring cells" relative to a "reference cell". For example, OTDOA assistance data may include "expected RSTD" parameters, which provide the MS information about the RSTD values the MS is expected to measure at its current location together with an uncertainty of the expected RSTD parameter. The expected RSTD together with the uncertainty defines then a search window for the MS where the MS is expected to measure the RSTD value. "Expected RSTDs" for cells in the OTDOA assistance data neighbor cell list are usually provided relative to an OTDOA assistance data reference cell. OTDOA assistance information may also include PRS configuration information parameters, which allow a MS to determine when a PRS positioning occasion occurs on signals received from various cells, and to determine the PRS sequence transmitted from various cells in order to measure a TOA.

Figure 3B:
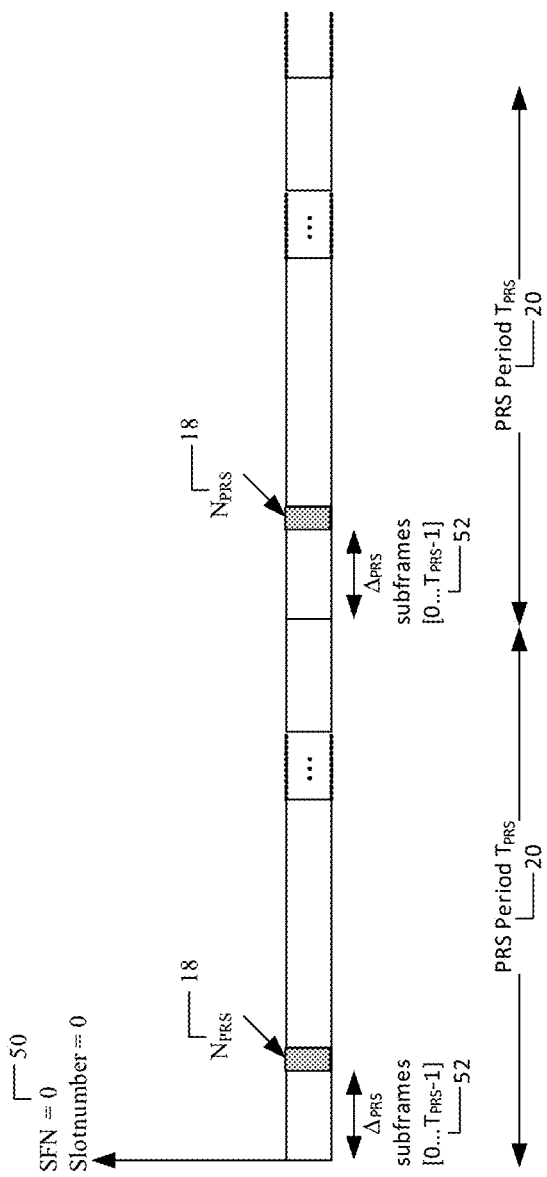
FIG. 3B illustrates the relationship between the System Frame Number (SFN), the cell specific subframe offset and the PRS Periodicity.

FIG. 3B illustrates the relationship between the System Frame Number (SFN), the cell specific subframe offset and the PRS Periodicity 20. Typically, the cell specific PRS subframe configuration is defined by a "PRS Configuration Index" $I_{PRS}$ included in the OTDOA assistance data. The cell specific subframe configuration period and the cell specific subframe offset for the transmission of positioning reference signals are defined based on the $I_{PRS}$, in the 3GPP specifications listed in Table 1 below.

TABLE 1

Positioning reference signal subframe configuration

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-4095 | Reserved | |

PRS configuration is defined with reference to the System Frame Number (SFN) of a cell that transmits PRS. PRS instances, for the first subframe of downlink subframes, satisfy $$(10 \times n_f + \lfloor n_s/2 \rfloor - \Delta_{PRS}) \bmod T_{PRS} = 0, \qquad (1)$$

where,
$n_f$ is the SFN with $0 \le SFN \le 1023$,
$n_s$ is the slot number of the radio frame with $0 \le n_s \le 19$,
$T_{PRS}$ is the PRS period, and
$\Delta_{PRS}$ is the cell-specific subframe offset.

As shown in FIG. 3B, the cell specific subframe offset $\Delta_{PRS}$ 52 may be defined in terms of the number of subframes transmitted starting from System Frame Number 0, Slot Number 0 50 to the start of a PRS positioning occasion. In FIG. 3B, the number of consecutive positioning subframes 18, $N_{PRS}=4$.

In some embodiments, when MS 120 receives a PRS configuration index $I_{PRS}$ in the OTDOA assistance data, MS 120 may determine PRS periodicity $T_{PRS}$ and PRS subframe offset $\Delta_{PRS}$ using Table 1. Upon obtaining information about the frame and slot timing i.e. the SFN and slot number ($n_f$, $n_s$) for cell 145-k, MS 120 may determine the frame and slot when a PRS is scheduled in cell 145-k. The OTDOA assistance data is determined by location server 150 and includes assistance data for a reference cell, and a number of neighbor cells.

Typically, PRS occasions from all cells 145 in network 130 are aligned in time. In SFN-synchronous networks all evolved NodeBs (eNBs) are aligned on both, frame boundary and system frame number. Therefore, in SFN-synchronous networks all cells use the same PRS configuration index. On the other hand, in SFN-asynchronous networks all eNBs are aligned on frame boundary, but not system frame number. Thus, in SFN-asynchronous networks the PRS configuration index for each cell is configured by the network so that PRS occasions align in time.

MS 120 may determine the timing of the PRS occasions of the assistance data cells, if MS 120 can obtain the cell timing (e.g., SFN or Frame Number) of at least one of the assistance data cells. The timing of the other assistance data cells may then be derived by MS 120, for example based on the assumption that PRS occasions from different cells overlap.

MS 120 may obtain the cell timing (SFN) of one of the reference or neighbor cells in OTDOA assistance data in order to calculate the frame and slot on which the PRS is transmitted. For example, as specified in the LPP, the cell serving MS 120 (the serving cell) may be included in the OTDOA assistance data, either as a reference cell or as an assistance data neighbor cell, because the SFN of the serving cell is always known to MS 120.

Further, as noted above, PRS may be muted in certain subframes. The PRS muting configuration of a cell, as specified by the LPP, is defined by a periodic muting sequence with periodicity $T_{REP}$ where $T_{REP}$, which is counted in terms of the number of PRS positioning occasions, can be 2, 4, 8, or 16. The first bit of the PRS muting sequence corresponds to the first PRS positioning occasion that starts after the beginning of the assistance data reference cell SFN=0. The PRS muting configuration is represented by a bit string of length 2, 4, 8, or 16 bits (corresponding to the selected $T_{REP}$), and each bit in this bit string can have the value "0" or "1". If a bit in the PRS muting is set to "0", then the PRS is muted in the corresponding PRS positioning occasion. Therefore, for OTDOA PRS positioning by MS 120 is facilitated obtaining the cell timing (SFN) of the reference cell.

In conventional systems, PRS positioning by MS 120 is facilitated by including the serving cell in the OTDOA assistance data. However, in conventional systems, in some situations, the serving cell may not be included in the OTDOA assistance data thereby precluding OTDOA PRS positioning. For example, in FIG. 1, the PRS may be configured only on the macrocells 145-1, 145-3, and 145-4 of network 130. The network may include one or more femtocells, such as cell 145-2. Femtocell location and timing may not be precisely known to location server 150 because femtocells are typically user-deployed. Thus, exemplary femtocell 145-2 (and any other femtocells in network 130) may not participate in the OTDOA positioning.

In addition, in some situations, network 130 may consist of several frequency layers. For example, in FIG. 1, macrocells 145-1, 145-3 and 145-4 may operate on radio frequency f2, while femtocells such as cell 145-2 may operate on a radio frequency f1. Further, PRS may also be configured and deployed on frequency layer f2. If the serving cell from MS 120 is femtocell 145-2, which belongs to the frequency layer f1, then the serving cell cannot be included in OTDOA assistance data because all assistance data cells are on frequency layer f2.

In conventional systems, MS 120 may be able to receive several macrocells such as 145-1, 145-3 and 145-4 with PRS (as shown by the dashed links in FIG. 1). However, information pertaining to the macrocells for which MS 120 could potentially obtain cell timing information is not available to location server 150. Thus, in conventional systems, location server 150 may not be able to determine and/or select appropriate OTDOA assistance data to provide to MS 120. For example, in conventional systems, in the situation above, location server 150 may include a reference cell in OTDOA assistance data, but MS 120 may not be able to obtain cell timing for that cell. Consequently, OTDOA positioning may take an inordinate amount of time and/or may fail. In general, conventional systems for providing OTDOA assistance data for OTDOA based positioning suffer from several additional drawbacks as outlined below.

In the example above, to obtain the SFN of a neighbor cell MS 120 may decode the Master Information Block (MIB) transmitted on the Physical Broadcast Channel (PBCH) of that neighbor cell by synchronizing to the neighbor cell using the Primary- and Secondary Synchronization Signals (PSS and SSS), and decoding the MIB transmitted on subframe 0 in every frame of the cell—a process, which may consume a considerable amount of time. If the OTDOA response time has already expired before MS 120 is able to perform actual RSTD measurements, then, the entire exercise by MS 120 may be futile.

In conventional systems, MS 120 cannot a priori determine neighbor cells for which MIB decoding will be successful. Therefore, MS 120 may cycle through several assistance data cells in the assistance data in an attempt to obtain timing information for one cell in the assistance data list, prior to performing any OTDOA measurements (such as Reference Signal Time Difference (RSTD) measurements). As noted earlier, the MIB decoding process over several cells may take an excessive amount of time and/or may fail.

Moreover, while MS 120 can perform neighbor cell measurements, typically, when in a RRC_CONNECTED_STATE (Radio Resource Control Connected State), MS 120 may not read neighboring cell system information broadcasts. Therefore, in order to decode the MIB on the PBCH, MS 120 may stop transmission/reception of the serving cell such as cell 145-2, and start synchronizing to neighbor cells to decode the MIB information.

Further, in the inter-frequency example mentioned above, in conventional systems, the difficulty in OTDOA positioning may be compounded, because MS 120 may: (i) stop transmission/reception on the serving cell carrier; (ii) tune the receiver to the frequency (f2) of the neighbor cell; (iii) synchronize to the neighbor cell; (iv) decode the MIB information of the neighbor cell; and (v) tune the receiver back to the serving cell frequency (f1).

Because MS 120 has stopped transmission/reception on the serving cell, user data transmitted by base stations (such as eNBs) during this period may result in a loss of data. However, because the positioning signaling occurs between MS 120 and location server 150 in a manner transparent to the base station, the base station may not be aware of OTDOA positioning requests and data loss may result.

To avoid data loss during the stopping of transmission/reception on the serving cell by MS 120, in conventional systems, MS 120 may request "measurement gaps" from a serving base station. During measurement gaps no data transmission/reception occurs between MS 120 and the base station. Measurement gaps are typically used for the purpose of measurements (for example, RSTD measurements) only and cannot exceed 6 ms in duration. The 6 ms duration is insufficient for the UE to tune its frequency to the neighbor cell carrier, search for PSS and SSS to synchronize to the neighbor cell, and to decode the PBCH in order to read the MIB which contains the SFN of the cell. Thus, in conventional systems, the use measurement gaps would not be sufficient for MS 120 to obtain SFN information of a neighbor cell.

Measurement gaps also suffer from another drawback that may prevent their use for performing PRS measurements and obtaining cell timing information (e.g. the SFN) of a measured cell. To obtain the SFN, for example, the UE may decode the MIB, which is transmitted in subframe 0 of every frame. Therefore, a MIB of a neighbor cell may be found during a measurement gap of the serving cell, if subframe 0 of the neighbor cell falls into a measurement gap of the serving cell. Since measurement gaps are arranged to facilitate performing neighbor cell PRS measurements (e.g., RSTD measurements), the measurement gap usually overlaps with a PRS occasion (which may be of 6 subframes length) of a neighbor cell. Subframe 0 however, does usually not include PRS, and therefore, no measurement gaps may overlap with subframe 0. This is because in subframe 0, PSS, SSS, and PBCH exist, and PRS symbols are usually not transmitted in such subframes, otherwise a reduced number of PRS symbols would be available for measurements lowering measurement accuracy. Measurement accuracy is lowered in the above situation because PRS symbols would not be provided in PSS, SSS, and PBCH symbols. Generally, since a radio frame consists of 10 subframes, and a measurement gap comprises only 6 subframes, there is a possibility that the subframe 0 (which carries the PBCH and is used for decoding SFN) of a neighbor cell will not occur during a measurement gap of the serving cell.

Therefore, embodiments disclosed facilitate the use of PRS signals for MS location determination including in situations where the serving cell cannot be included in the OTDOA assistance data.

FIG. 4 shows a flowchart for an exemplary method 200 for providing OTDOA assistance data to MS 120 in a manner consistent with disclosed embodiments. In some embodiments, method 200 may be performed by location server 150. In some embodiments, method 200 may be implemented as part of a modified Enhanced Cell ID (E-CID) call flow procedure prior to OTDOA measurement.

In some embodiments, in step 210, location server 150 may request, from MS 120, measurements pertaining to one or more neighbor cells. For example, the requested measurements may include signal strength measurements such as a Received Signal Strength Indicator (RSSI), signal quality measurements for the neighbor cells, cell timing information (such as cell timing offset information), etc for measured neighbor cells. The term "measured neighbor cell" is used to refer to neighbor cells which have been measured by MS 120. In some embodiments, the parameters requested by the location server may optionally include the Cell Global Identity (CGI) or E-UTRAN Cell Global Identity (ECGI) of any measured neighbor cells.

In step 220, location server 150 may receive measurements for at least one measured neighbor cell relative to the serving cell and/or location server. The received measurements may include cell timing offset information for at least one measured neighbor cell, and, if requested, the Cell Global Identity (CGI) or E-UTRAN Cell Global Identity (ECGI) of the at least one measured neighbor cell. The cell timing offset information may include the offset between the SFN of the serving cell and the SFN of the at least one measured neighbor cell and/or the location server.

For example, in one embodiment, MS 120 may perform the measurements requested by location server 150 and send the measurements and other parameters to location server 150. Additionally, MS 120 may synchronize to the measured neighbor cell and read the system information broadcast message. The SFN of the measured cell may be obtained by MS 120 by reading the MIB, while the CGI/ECGI may be obtained by reading the System Information Block Type 1 (SIB1). MS 120 may then determine the SFN offset between the serving cell and each measured neighbor cell. The SFN offset and the CGI/ECGI (if requested) for each measured neighbor cell may be reported to the location server 150.

In some embodiments, upon receipt of measurements and parameters from MS 120 location server 150 may determine the neighbor cells for which MS 120 can obtain timing information. In addition, in some embodiments, location server 150 may also receive information pertaining to the SFN-offset between the serving cell for MS 120 and neighbor cells.

Next, in step 230, OTDOA assistance data comprising an OTDOA assistance data reference cell and cell timing offset between the serving cell and the OTDOA assistance data reference cell may be generated. In some embodiments, the OTDOA assistance data reference cell may be selected by location server 150 based on received cell timing offset information for the at least one measured neighbor cell. For example, location server 150 may select a reference cell for OTDOA assistance data for which MS 120 was able to obtain the timing information. In some embodiments, location server 150 may select the measured neighbor cell with the strongest RSSI, Reference Signal Received Power (RSRP) and/or Reference Signal Received Quality (RSRQ) (as measured/reported by MS in step 511), which also includes timing information (e.g. SFN), as the reference cell.

In step 240, location server 150 may send the OTDOA assistance data to MS 120. The OTDOA assistance data may include the SFN-offset between the serving cell for MS 120 and the OTDOA assistance data reference cell. In some embodiments, the OTDOA assistance data may be sent in conjunction with a request for OTDOA measurements by MS 120.

FIG. 5 shows a flowchart for an exemplary method 300 for obtaining cell timing information (SFN) for neighbor cells and performing OTDOA measurements in a manner consistent with disclosed embodiments. In some embodiments, method 300 may be performed by MS 120.

In some embodiments, in step 310, MS 120 may request idle periods from a base station. In some embodiments, the request for idle periods may include an indication of whether Discontinuous Reception (DRX) is desired, or a request to use autonomous gaps. For example, MS 120 may request an appropriate DRX configuration, or an allowance to use autonomous gaps from the serving base station. Autonomous gaps refer to periods where MS 120 may suspend reception and transmission with the base station. Discontinuous Reception (DRX) is a protocol where the MS 120 and the base station may negotiate phases during which data transfer occurs.

In some embodiments, the idle periods may be used by MS 120 to obtain cell timing information and/or CGI for one or more neighboring cells. In some embodiments, the request for idle periods may be made by MS 120 in response to a request received by MS 120 for measurements pertaining to one or more neighbor cells. In some embodiments, the request for measurements pertaining to one or more neighbor cells received by MS 120 may be initiated by location server 150 and may comprise a request to obtain the cell timing (e.g., SFN) of the measured cells, and may also include a request to report the CGI/ECGI of the measured neighbor cell.

In some embodiments, the serving base station may configure DRX in response to the request from MS 120 by sending an RRC Connection Reconfiguration message.

In step 320, MS 120 may receive confirmation that idle periods have been configured. In some embodiments, the confirmation may take the form of an appropriate DRX configuration, or an indication that autonomous gaps are allowed at MS 120. DRX functionality may be configured for MS 120 in RRC_CONNECTED state so that the MS 120 does not always need to monitor the downlink channels. A DRX cycle may comprise an "On Duration" during which MS 120 monitors the downlink channels and a "DRX period" during which MS 120 can skip the reception of downlink channels.

With autonomous gaps MS 120 may create idle periods on its own to read the MIB and possibly SIB1 of neighbor cells. However, autonomous gaps may result in a loss of data in the event that the base station transmits data to the target device during the idle period created by the target device. Therefore, in some embodiments, MS 120 may inform the serving base station regarding its use of autonomous gaps to fulfill the measurement request from location server 150. Consequently, in some embodiments, the serving base station may not schedule data for the device during the autonomous gap. In some embodiments, the data rate of any transmissions to MS 120 during the autonomous gap may be lowered thereby limiting any data loss. For example, the number of subframes lost during the autonomous gap may be relatively small so that the disruption may appear merely as a fading/channel error to the serving base station. Thus, with autonomous gaps, any QoS impact to Voice over Internet Protocol (VoIP) services may be minimal. If the serving base station allows autonomous gaps, it sends a confirmation to MS 120 that MS 120 may use autonomous gaps. In some embodiments, the confirmation that autonomous gaps may be used by MS 120 may also include a time window during which autonomous gaps are allowed, and the maximum number subframes allowed for an autonomous gap.

Next, in step 330, MS 120 may perform the requested measurements for one or more neighbor cells. For example, during the "DRX period" MS 120 may have an idle period, and during the idle period MS 120 may search for the neighbor cells and decode the MIB information to obtain the SFN. In some embodiments, MS 120 may also decode the SIB1 during the idle period to obtain the CGI/ECGI, if requested.

In step 340, MS 120 may send the measurements for one or more neighbor cells and corresponding cell timing offset to the location server. The cell timing offset may comprise the offset between the SFN of the serving cell and the SFN of the measured neighbor cell. In some embodiments, MS 120 may also send the CGI/ECGI of the measured neighbor cells, if measurement of CGI/ECGI was requested.

FIG. 6 shows a flowchart for an exemplary method 400 for determining the PRS occasions of assistance data cells, where the assistance data cells do not include the serving cell for MS 120.

In step 410, MS 410 may receive OTDOA assistance data from location server 150 and a request for OTDOA measurements. In some embodiments, the OTDOA assistance data may include the SFN-offset between the MS serving cell and the OTDOA assistance data reference cell. In some embodiments, the OTDOA assistance data may have been generated at location server 150 using exemplary method 200.

Next, in step 420, MS 120 may use the SFN of its serving cell (which is conventionally known to MS 120) and the SFN-offset of the OTDOA assistance data reference cell to determine the SFN of the OTDOA assistance data reference cell.

In step 430, MS 120 may use the obtained SFN of the OTDOA assistance data reference cell to determine the subframes in which PRS are scheduled in the downlink. In some embodiments, MS 120 may determine the PRS occasions of the neighbor cells based on the SFN of the assistance data reference cell and PRS information that may be included in the OTDOA assistance data.

Figure 7:
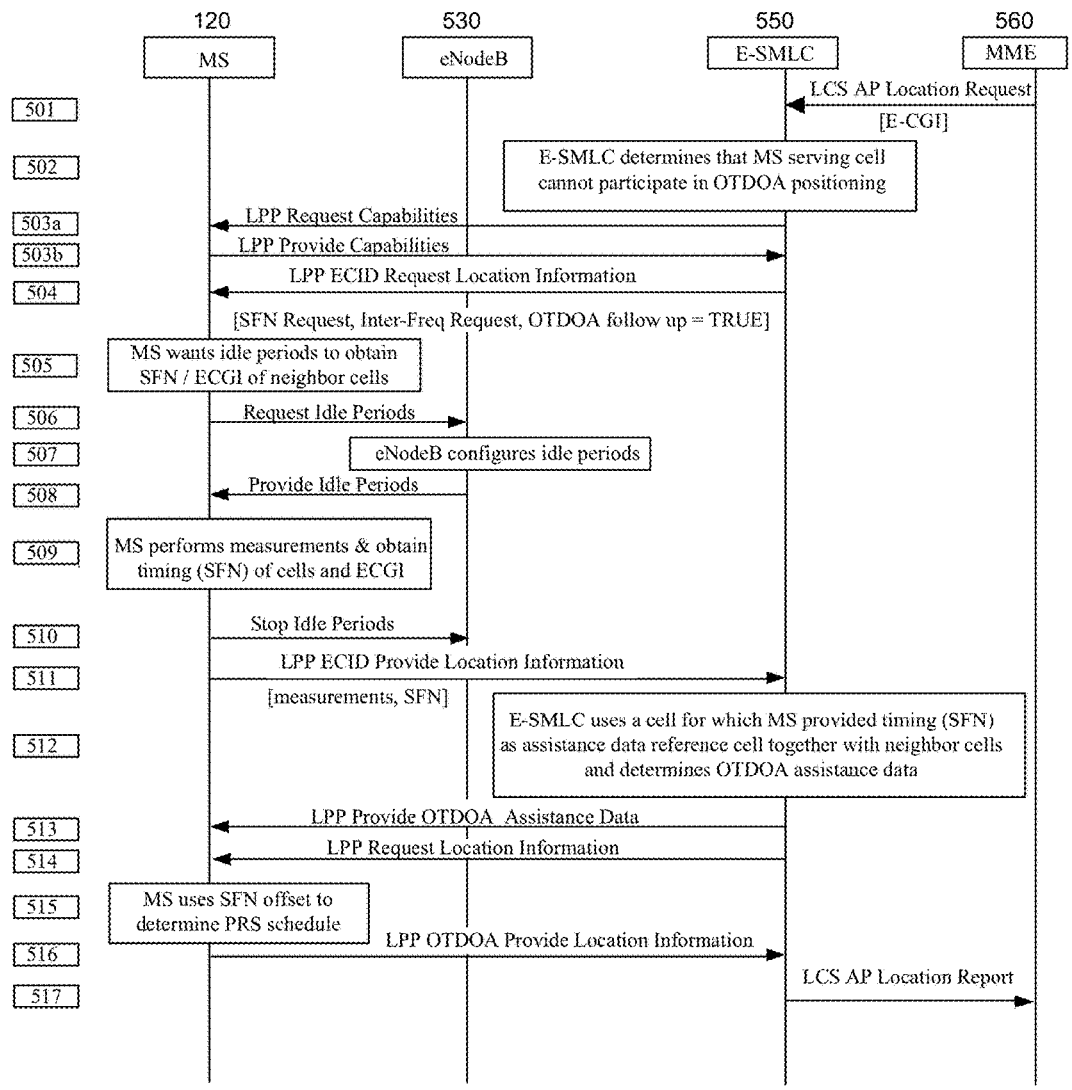
FIG. 7 illustrates exemplary message flow 500 of a procedure that supports determination and transfer of OTDOA assistance data in a manner consistent with disclosed embodiments.

FIG. 7 illustrates exemplary message flow 500 of a procedure that supports determination and transfer of OTDOA assistance data in a manner consistent with disclosed embodiments. In some embodiments, message flow 500 may be implemented using the LPP or LPPe protocols. For the sake of example, the message flow is described as LPP messages.

At step 501, location server 150, which may take the form of Evolved Serving Mobile Location Centre (E-SMLC) 550, may receive a request for the location of MS 120, from LCS Client 160, which is shown as Mobility Management Entity 560 in FIG. 7. For example, the request for the location of MS 120 may take the form of an LCS Application Protocol (LCS-AP) Location Request message and may include the ECGI of the serving cell of MS 120.

At step 502, the E-SMLC 550 may determine that MS serving cell, such as exemplary cell 145-2, may not be able to participate in an OTDOA positioning procedure. For example, serving cell 145-2 may not transmit PRS. As another example, in instances where serving cell 145-2 may take the form of a femtocell, serving cell 145-2 may not be known to the location server.

Accordingly, in step 503*a*, E-SMLC 550 may obtain the positioning related capabilities of MS 120 by sending a LPP/LPPe Request Capabilities message to MS 120 at step 503*a*. The Request Capabilities message requests the LPP/LPPe capabilities of the MS 120.

The MS 120 may respond with a LPP/LPPe Provide Capabilities message sent to E-SMLC 550 in step 503*b* of the message flow. In certain aspects of the described embodiments, the LPP/LPPe Provide Capabilities message may be provided by MS 120 unsolicited in step 503*b* in the absence of a Request Capabilities message being sent in step 503*a*. In another embodiment, the Provide Capabilities message in step 503*b* may be sent by MS 120 in association with a request for assistance data. The Provide Capabilities message includes, among other parameters, an indication of MS OTDOA and Enhanced Cell ID (ECID) capabilities. The capability to support ECID also includes information on whether MS 120 is capable of measuring the cell timing of neighbor cells and obtaining the CGI/ECGI of the measured cells. The capability to support ECID may also include information on whether MS 120 is capable of performing measurements and obtaining cell timing and ECGI of inter-frequency neighbor cells, where an "inter-frequency" refers to a frequency different from the MS serving cell frequency.

Steps similar to steps 503*a* and 503*b* but with message transfer in the opposite direction may be performed instead of step 503*a* and 503*b* or in addition to steps 503*a* and 503*b* to transfer the LPP/LPPe capabilities of E-SMLC 550 to MS 120 regarding support for OTDOA and ECID capabilities. These steps are not shown in FIG. 7 and, if used, may make use of a reversed LPPe mode whereby a MS 120 is enabled to request and receive capabilities from E-SMLC 550.

In step 504, if MS 120 is capable of obtaining cell timing and/or ECGI of measured cells, then, E-SMLC 550 may send an LPP ECID Request Location Information message to MS 120. The LPP ECID Request Location Information message may include one or more of the following: a list of requested measurements such as Reference Signal Received Power (RSRP), Reference Signal Received Quality (RSRQ) measurements; a request to report the cell timing offset (SFN-offset) between the UE serving cell and the measured cell; a request to report the ECGI of the measured cell; a request to perform inter-frequency measurements together with a frequency list for which the measurements are requested; and/or an indication that this request is part of an OTDOA positioning procedure, or an indication that an OTDOA location request will follow later.

In step 505, MS 120 may determine to use idle periods to obtain the cell timing (SFN) and/or ECGI of the neighbor cells. Accordingly, in step 506, MS 120 may send a Request for Idle Periods to serving base station eNB 530. In some embodiments, the Request for Idle Periods may include a request for serving eNB 530 to configure appropriate DRX so that the UE can read MIB and/or SIB1 during inactivity periods, or may include a request to use autonomous gaps at MS 120. In some embodiments, the Request for Idle Periods may include a desired length for the idle period, which may be used by serving eNB 530 to configure an appropriate DRX period. In some embodiments, the Request for Idle Periods may include an indication whether MS 120 requests idle periods for decoding MIB information only (e.g., SFN), or for decoding both, MIB and System Information Block 1 (SIB1) information (e.g., SFN and ECGI).

In step 507, serving eNB 530 may configure DRX parameters. In step 508, serving eNB 530 may provide the DRX settings to MS 120. In some embodiments, eNB 530 may provide idle period using a RRC Connection Reconfiguration message. Alternatively, in step 508, if the eNB 530 allows MS 120 to use autonomous gaps, then, eNB 530 may inform MS 120 that autonomous gaps are allowed. In some embodiments, eNB 530 may also include information about maximum length of the allowed autonomous gaps, and/or overall maximum time during which the UE is allowed to create autonomous gaps. For example, eNB 530 may allow MS 120 to use autonomous gaps for the next 80 ms, or may allow MS 120 to use autonomous gaps for the next 80 ms starting at a particular SFN. The length of the idle period/autonomous gap may depend on the request from the MS at step 506. If the request for idle periods is for decoding MIB only, then the autonomous gaps may be shorter (for example, 40 ms) since MIB is usually repeated every 40 ms. If the request for idle periods is for decoding SIB1, then the autonomous gaps may be longer (for example 80 ms) since SIB1 is usually repeated every 80 ms. eNB 530 may also allow MS 120 to create autonomous gaps for a total duration of 5 seconds for example, where each autonomous gap can be at most 80 ms in length with 100 ms separation between gaps, for example. This may allow the MS to decode MIB and possibly SIB1 for a number of neighbor cells. The timing information provided above is merely exemplary. In general, the length of idle periods/autonomous gaps may be set and/or varied according to system parameters.

In step 509, MS 120 may perform the measurements requested in step 504 during idle periods. In step 510, after completing the requested measurements, MS 120 informs eNB 530 that it does not need further idle periods, and/or will not use autonomous gaps.

In step 511, MS 120 may report the measurements to E-SMLC 550 in a LPP ECID Provide Location Information message. In some embodiments, the LPP ECID Provide Location Information message may include the SFN-offset (i.e., SFN-offset between the serving cell 145-2 for MS 120 and each measured neighbor cell) and the ECGI of the measured neighbor cells.

At step 512, E-SMLC may have sufficient information to provide assistance data for OTDOA positioning. In particular, E-SMLC 550 may have information pertaining to cells 145 for which the UE can obtain timing information. In addition, E-SMLC 550 may also have information pertaining to the SFN-offset between the serving cell for MS 120 and one or more neighbor cells. In step 512, E-SMLC 550 may select one of the measured neighbor cells as the reference cell for OTDOA assistance data. For example, E-SMLC 550 may select a measured neighbor cell with timing information (SFN) and the strongest RSSI, RSRP and/or RSRQ (as measured/reported by MS in step 511) as the reference cell. Further, E-SMLC 550 may also select OTDOA assistance data neighbor cells from among the measured neighbor cells. In message flow 500, because serving cell 145-2 cannot participate in the OTDOA positioning (as determined in step 502), none of the OTDOA assistance data cells provided to MS 120 in step 512 include MS serving cell 145-2.

At step 513, E-SMLC 550 may send the OTDOA assistance data to MS 120. In some embodiments, the OTDOA assistance data may include Reference Cell Information (Cell ID, EARFCN, PRS Information, etc.), the SFN-Offset between the MS serving cell and this reference cell (as determined in step 511), and neighbor cell information (Cell ID, EARFCN, PRS Information, etc.).

Next, in step 514, the location server may request OTDOA measurements. In step 515, MS 120 uses the SFN of the serving cell (which is conventionally known to MS 120) and the provided SFN-offset to determine the SFN of the assistance data reference cell. The SFN of the reference cell allows MS 120 to determine when PRS occasions occur for the OTDOA measurements. MS 120 may then perform the OTDOA measurements and report the measurement back to E-SMLC 550 in step 516 in a LPP OTDOA Provide Location Information message. For example, MS 120 may measure RSTDs between the OTDOA reference cell and multiple neighbor cells based on the OTDOA assistance data received in step 513.

In step 517, E-SMLC 550 may use the provided OTDOA measurements to calculate the location of MS 120. E-SMLC 550 may then reports the location of MS 120 in a LCS-AP Location Report message to the MME 560.

Figure 8:
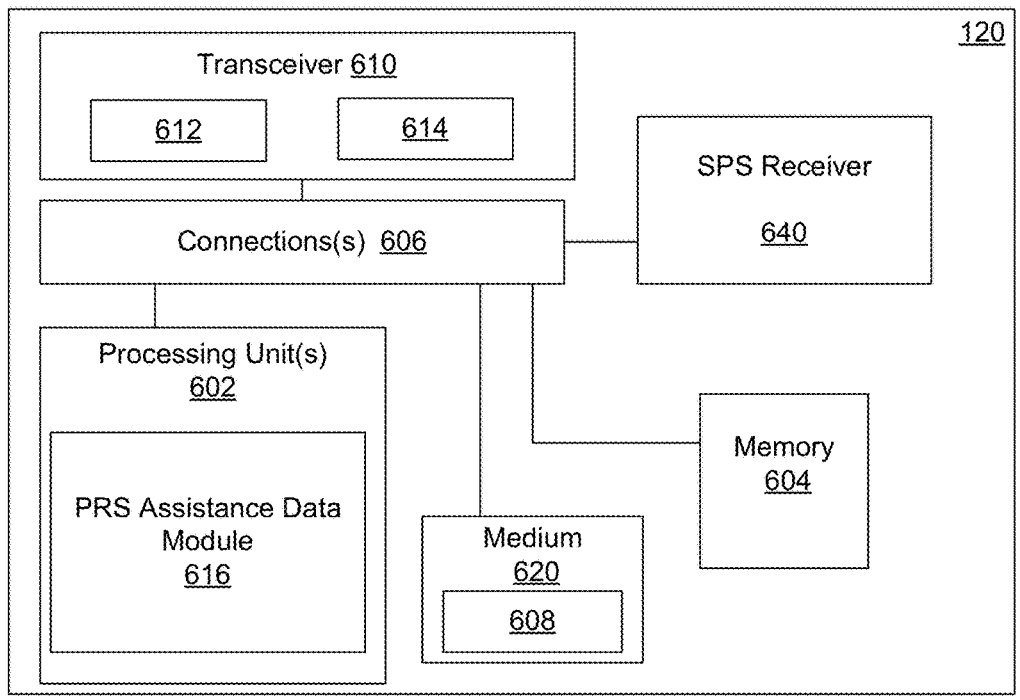
FIG. 8 shows a schematic block diagram illustrating certain exemplary features of MS enabled to support OTDOA measurement using OTDOA assistance information for non-serving cells in a manner consistent with disclosed embodiments.

FIG. 8 shows a schematic block diagram illustrating certain exemplary features of MS 120 enabled to support OTDOA measurement using OTDOA assistance information for non-serving cells in a manner consistent with disclosed embodiments. MS 120 may, for example, include one or more processing units 602, memory 604, a transceiver 610 (e.g., wireless network interface), and (as applicable) an SPS receiver 640, which may be operatively coupled with one or more connections 606 (e.g., buses, lines, fibers, links, etc.) to non-transitory computer-readable medium 620 and memory 604. In certain example implementations, all or part of MS 120 may take the form of a chipset, and/or the like. The SPS receiver 640 may be enabled to receive signals associated with one or more SPS resources. Transceiver 610 may, for example, include a transmitter 612 enabled to transmit one or more signals over one or more types of wireless communication networks and a receiver 614 to receive one or more signals transmitted over the one or more types of wireless communication networks.

Processing unit 602 may be implemented using a combination of hardware, firmware, and software. In some embodiments, processing unit 602 may include MS OTDOA Assistance Data Module 616, which may process received OTDOA assistance information, including OTDOA assistance information for non-serving cells, and perform portions of method 400 and message flow 500. For example, MS OTDOA Assistance Data Module 616 may process OTDOA assistance information comprising Reference Cell Information (Cell ID, EARFCN, PRS Information, etc.), the SFN-Offset between the MS serving cell and this reference cell (as determined in step 511), and neighbor cell information (Cell ID, EARFCN, PRS Information, etc.). Further MS OTDOA Assistance Data Module 616 may be configured to generate requests for idle periods or autonomous gaps, process idle period or autonomous gap configuration messages received from base stations/eNB 530 to facilitate OTDOA measurements when the cell serving MS 120 is unable to participate in the OTDOA positioning process. In some embodiments, processing unit 602 may represent one or more circuits configurable to perform at least a portion of a data signal computing procedure or process related to the operation of MS 120.

In some embodiments, MS 120 may include one or more MS antennas (not shown) which may be internal or external. MS antennas may be used to transmit and/or receive signals processed by transceiver 610 and/or SPS receiver 640. In some embodiments, MS antennas may be coupled to transceiver 610 and SPS receiver 640. In some embodiments, measurements of signals received (transmitted) by MS 120 may be performed at the point of connection of the MS antennas and transceiver 610. For example, the measurement point of reference for received (transmitted) RF signal measurements may be an input (output) terminal of the receiver 614 (transmitter 612) and an output (input) terminal of the MS antennas. In an MS 120 with multiple MS antennas or antenna arrays, the antenna connector may be viewed as a virtual point representing the aggregate output (input) of multiple MS antennas. In some embodiments, MS 120 may measure received signals including signal strength and TOA measurements and the raw measurements may be processed by processing units 602.

The methodologies described herein may be implemented by various means depending upon the application. For example, these methodologies may be implemented in hardware, firmware, software, or any combination thereof. For a hardware implementation, the processing unit 602 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a non-transitory computer-readable medium 620 or memory 604 that is connected to and executed by processing unit 602. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 608 on a non-transitory computer-readable medium, such as medium 620 and/or memory 604. Examples include computer-readable media encoded with a data structure and computer-readable media encoded with a computer program 608. For example, the non-transitory computer-readable medium including program code 608 stored thereon may include program code 608 to support OTDOA measurement using OTDOA assistance information for non-serving cells in a manner consistent with disclosed embodiments. Non-transitory computer-readable media 620 includes physical computer storage media. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code 608 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium 620, instructions and/or data may be provided as signals on transmission media included in a communication apparatus. For example, a communication apparatus may include a transceiver 610 having signals indicative of instructions and data. The instructions and data are configured to cause one or more processors to implement the functions outlined in the claims. That is, the communication apparatus includes transmission media with signals indicative of information to perform disclosed functions.

Memory 604 may represent any data storage mechanism. Memory 604 may include, for example, a primary memory and/or a secondary memory. Primary memory may include, for example, a random access memory, read only memory, etc. While illustrated in this example as being separate from processing unit 602, it should be understood that all or part of a primary memory may be provided within or otherwise co-located/coupled with processing unit 602. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer-readable medium 620. As such, in certain example implementations, the methods and/or apparatuses presented herein may take the form in whole or part of a computer-readable medium 620 that may include computer implementable instructions 608 stored thereon, which if executed by at least one processing unit 602 may be operatively enabled to perform all or portions of the example operations as described herein. Computer readable medium 620 may be a part of memory 604.

Figure 9:
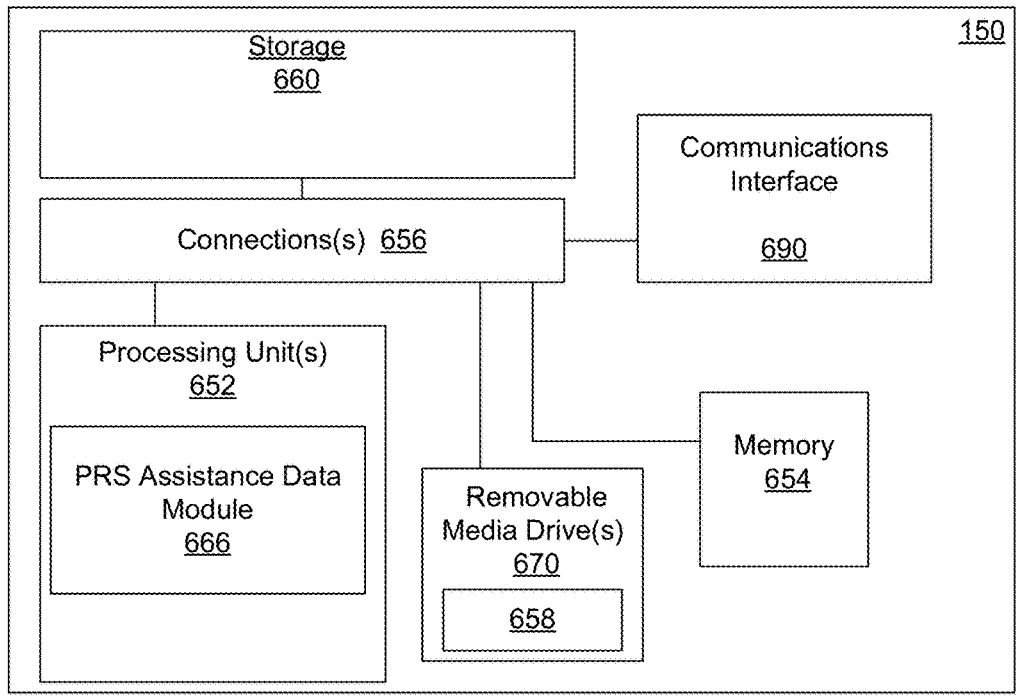
FIG. 9 shows a schematic block diagram illustrating a server enabled to support location services for an MS, including support for OTDOA measurement by providing OTDOA assistance information for non-serving neighbor cells of the MS in a manner consistent with disclosed embodiments.

Reference is now made to FIG. 9, which is a schematic block diagram illustrating a server 150 enabled to support OTDOA measurement using OTDOA assistance information for non-serving cells in a manner consistent with disclosed embodiments. In some embodiments, server 150 may perform functions of location server 150 and/or E-SMLC 550. In some embodiments, server 150 may include, for example, one or more processing units 652, memory 654, storage 660, and (as applicable) communications interface 690 (e.g., wireline or wireless network interface), which may be operatively coupled with one or more connections 656 (e.g., buses, lines, fibers, links, etc.). In certain example implementations, some portion of server 150 may take the form of a chipset, and/or the like.

Communications interface 690 may include a variety of wired and wireless connections that support wired transmission and/or reception and, if desired, may additionally or alternatively support transmission and reception of one or more signals over one or more types of wireless communication networks. Communications interface 690 may also include interfaces for communication with various other computers and peripherals. For example, in one embodiment, Communications interface 690 may comprise network interface cards, input-output cards, chips and/or ASICs that implement one or more of the communication functions performed by server 150. In some embodiments, communications interface 690 may also interface with network 130 to obtain a variety of network configuration related information, such as PCIs, configured PRS information, and/or timing information used by the base stations in the network.

For example, Communications interface 690 may make use of the LPP annex (LPPa) protocol defined in 3GPP TS 36.455 or a modification of this protocol to obtain PCI, configured PRS, timing and/or other information from the base stations in network 130. Processing unit 652 may use some or all of the received information to generate OTDOA assistance data information in a manner consistent with disclosed embodiments.

Processing unit 652 may be implemented using a combination of hardware, firmware, and software. In some embodiments, processing unit 652 may include Server OTDOA Assistance Data Module 666, which may generate OTDOA assistance information including OTDOA assistance information for non-serving cells, compute the location of MS 120 based on OTDOA measurements performed by MS 120 etc. In some embodiments, processing unit 652 may generate the OTDOA assistance information as Long Term Evolution (LTE) Positioning Protocol (LPP) or LPP extensions (LPPe) messages. In some embodiments, processing unit 652 may represent one or more circuits configurable to perform at least a portion of a data signal computing procedure or process related to the operation of server 150.

The methodologies described herein in flow charts and message flows may be implemented by various means depending upon the application. For example, these methodologies may be implemented in hardware, firmware, software, or any combination thereof. For a hardware implementation, the processing unit 652 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software may be stored in removable media drive 670, which may support the use of non-transitory computer-readable media 658, including removable media. Program code may be resident on non-transitory computer readable media 658 or memory 654 and may be read and executed by processing units 652. Memory may be implemented within processing units 652 or external to processing units 652. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable medium 658 and/or memory 654. Examples include computer-readable media encoded with a data structure and computer-readable media encoded with a computer program. For example, non-transitory computer-readable medium 658 including program code stored thereon may include program code to support OTDOA measurement using OTDOA assistance information in a manner consistent with disclosed embodiments.

Non-transitory computer-readable media includes a variety of physical computer storage media. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Other embodiments of non-transitory computer readable media include flash drives, USB drives, solid state drives, memory cards, etc. Combinations of the above should also be included within the scope of computer-readable media.

In addition to storage on computer readable medium, instructions and/or data may be provided as signals on transmission media to communications interface 690, which may store the instructions/data in memory 654, storage 660 and/or relayed the instructions/data to processing units 652 for execution. For example, communications interface 690 may receive wireless or network signals indicative of instructions and data. The instructions and data are configured to cause one or more processors to implement the functions outlined in the claims. That is, the communication apparatus includes transmission media with signals indicative of information to perform disclosed functions.

Memory 654 may represent any data storage mechanism. Memory 654 may include, for example, a primary memory and/or a secondary memory. Primary memory may include, for example, a random access memory, read only memory, non-volatile RAM, etc. While illustrated in this example as being separate from processing unit 652, it should be understood that all or part of a primary memory may be provided within or otherwise co-located/coupled with processing unit 652. Secondary memory may include, for example, the same or similar type of memory as primary memory and/or storage 660 such as one or more data storage devices 660 including, for example, hard disk drives, optical disc drives, tape drives, a solid state memory drive, etc. In some embodiments, storage 660 may comprise one or more databases that may hold information pertaining to various entities in system 100 and/or the broader cellular network. In some embodiments, information in the databases may be read, used and/or updated by processing units 652 during various computations, including storing capabilities of MS 120, capabilities of server 150, generating OTDOA assistance data, computing a location of MS 120, etc.

In certain implementations, secondary memory may be operatively receptive of, or otherwise configurable to couple to a non-transitory computer-readable medium 658. As such, in certain example implementations, the methods and/or apparatuses presented herein may take the form in whole or part of a removable media drive 670 that may include non-transitory computer readable medium 658 with computer implementable instructions stored thereon, which if executed by at least one processing unit 652 may be operatively enabled to perform all or portions of the example operations as described herein. Computer readable medium 658 may be a part of memory 654.

Although the present disclosure is described in connection with specific embodiments for instructional purposes, the disclosure is not limited thereto. Various adaptations and modifications may be made to the disclosure without departing from the scope. Therefore, the spirit and scope of the appended claims should not be limited to the foregoing description.

What is claimed is:

1. A method of providing Observed Time Difference of Arrival (OTDOA) assistance information, the method comprising:
   requesting, from a Mobile Station (MS), measurements including cell timing information for one or more neighbor cells of the MS;
   receiving neighbor cell measurements for a subset of the one or more neighbor cells, the neighbor cell measurements including cell timing information comprising cell timing offsets of the neighbor cells in the subset relative to a serving cell for the MS, each cell timing offset associated with a distinct neighbor cell in the subset; and
   generating OTDOA assistance data comprising an OTDOA assistance data reference cell and a System Frame Number (SFN) offset between the serving cell and the OTDOA assistance data reference cell, the OTDOA assistance data reference cell being selected based on the received neighbor cell measurements.

2. The method of claim 1, further comprising:
   sending the OTDOA assistance data to the MS.

3. The method of claim 2, wherein the OTDOA assistance data is sent to the MS using Long Term Evolution (LTE) Positioning Protocol (LPP) or LPP extensions (LPPe) messages.

4. The method of claim 1, wherein the OTDOA assistance data further comprises:
   OTDOA assistance data cell information comprising a set of OTDOA assistance data cells, the OTDOA assistance data cells being selected based on the received neighbor cell measurements.

5. The method of claim 1, wherein the measurements requested from the MS further comprise a Cell Global Identity (CGI) or an Evolved UTRAN Cell Global Identity (ECGI) for the one or more neighbor cells.

6. The method of claim 1, wherein the method is performed by a location server communicatively coupled to the MS.

7. A server comprising:
   a processor, the processor configured to request, from a Mobile Station (MS), measurements including cell timing information for one or more neighbor cells of the MS, the cell timing information comprising cell timing offsets of the neighbor cells relative to a serving cell for the MS, each cell timing offset associated with a distinct neighbor cell, and
   a communications interface coupled to the processor, the communications interface configured to receive the neighbor cell measurements for a subset of the neighbor cells;
   wherein the processor is further configured to generate Observed Time Difference of Arrival (OTDOA) assistance data comprising an OTDOA assistance data reference cell and a System Frame Number (SFN) offset between the serving cell and the OTDOA assistance data reference cell, the OTDOA assistance data reference cell being selected based on the received neighbor cell measurements.

8. The server of claim 7, wherein:
   the communications interface is further configured to send the OTDOA assistance data to the MS.

9. The server of claim 7, wherein the processor is configured to generate the OTDOA assistance data as Long Term Evolution (LTE) Positioning Protocol (LPP) or LPP extensions (LPPe) messages.

10. The server of claim 7, wherein the OTDOA assistance data further comprises:
    OTDOA assistance data cell information comprising a set of OTDOA assistance data cells,
    wherein the processor is configured to select the OTDOA assistance data cells based on the received neighbor cell measurements.

11. The server of claim 7, wherein:
    the measurements requested from the MS further comprise a Cell Global Identity (CGI) or an Evolved UTRAN Cell Global Identity (ECGI) of the one or more neighbor cells.

12. An apparatus comprising:
    means for requesting, from a Mobile Station (MS), measurements including cell timing information for one or more neighbor cells of the MS, the cell timing information comprising cell timing offsets of the neighbor cells relative to a serving cell for the MS, each cell timing offset associated with a distinct neighbor cell,
    means for receiving the requested neighbor cell measurements for a subset of the neighbor cells; and
    means for generating Observed Time Difference of Arrival (OTDOA) assistance data comprising an OTDOA assistance data reference cell and a System Frame Number (SFN) offset between the serving cell and the OTDOA assistance data reference cell, the OTDOA assistance data reference cell being selected based on the received neighbor cell measurements.

13. The apparatus of claim 12, further comprising:
    means for sending the OTDOA assistance data to the MS.

14. The apparatus of claim 12, wherein the OTDOA assistance data is generated as Long Term Evolution (LTE) Positioning Protocol (LPP) or LPP extensions (LPPe) messages.

15. The apparatus of claim 12, wherein the means for generating OTDOA assistance data further comprises:
    means for selecting OTDOA assistance data cells based on the received neighbor cell measurements, and
    wherein the means for generating OTDOA assistance data includes the selected OTDOA assistance data cells as part of OTDOA assistance data cell information in the generated OTDOA assistance data.

16. The apparatus of claim 12, wherein:
    the measurements requested from the MS further comprise a Cell Global Identity (CGI) or an Evolved UTRAN Cell Global Identity (ECGI) of the one or more neighbor cells.

17. A non-transitory computer-readable medium comprising instructions, which, when executed by a processor, perform steps in a method for providing Observed Time Difference of Arrival (OTDOA) assistance information, the steps comprising:
    requesting, from a Mobile Station (MS), measurements including cell timing information for one or more neighbor cells of the MS;
    receiving neighbor cell measurements for a subset of the one or more neighbor cells, the neighbor cell measurements including cell timing information comprising cell timing offsets of the neighbor cells in the subset relative to a serving cell for the MS, each cell timing offset associated with a distinct neighbor cell in the subset; and
    generating OTDOA assistance data comprising an OTDOA assistance data reference cell and a System Frame Number (SFN) offset between the serving cell and the OTDOA assistance data reference cell, the OTDOA assistance data reference cell being selected based on the received neighbor cell measurements.

18. The computer-readable medium of claim 17, further comprising:
sending the OTDOA assistance information to the MS.

19. The computer-readable medium of claim 17, wherein the OTDOA assistance data further comprises:
OTDOA assistance data cell information comprising a set of OTDOA assistance data cells, the OTDOA assistance data cells being selected based on the received neighbor cell measurements.

20. The computer-readable medium of claim 17, wherein the measurements requested from the MS further comprise a Cell Global Identity (CGI) or an Evolved UTRAN Cell Global Identity (ECGI) of the one or more neighbor cells.

21. The computer-readable medium of claim 17, wherein the OTDOA assistance information is sent to the MS using Long Term Evolution (LTE) Positioning Protocol (LPP) or LPP extensions (LPPe) messages.

* * * * *